United States Patent
Mercuriali

(10) Patent No.: US 7,298,747 B2
(45) Date of Patent: Nov. 20, 2007

(54) METHOD OF SETTING UP COMMUNICATIONS IN A PACKET SWITCHING SYSTEM

(75) Inventor: Jean-Pierre Mercuriali, Orsay (FR)

(73) Assignee: Aastra Matra Telecom, Guyancourt (FR)

( * ) Notice: Subject to any disclaimer, the term of this patent is extended or adjusted under 35 U.S.C. 154(b) by 790 days.

(21) Appl. No.: 10/332,183

(22) PCT Filed: Jul. 5, 2001

(86) PCT No.: PCT/FR01/02161

§ 371 (c)(1), (2), (4) Date: Apr. 29, 2003

(87) PCT Pub. No.: WO02/05512

PCT Pub. Date: Jan. 17, 2002

(65) Prior Publication Data
US 2003/0179753 A1    Sep. 25, 2003

(30) Foreign Application Priority Data
Jul. 7, 2000    (FR) .................................. 00 08897

(51) Int. Cl.
*H04L 12/56* (2006.01)
(52) U.S. Cl. .................. 370/395.21; 370/352; 370/401
(58) Field of Classification Search ............. 370/395.2, 370/260, 261, 262, 351, 356, 360, 397, 238, 370/401, 352, 465, 402, 377, 395.21, 252, 370/253; 379/70, 84, 88.07, 88.12, 88.13; 709/223–226
See application file for complete search history.

(56) References Cited

U.S. PATENT DOCUMENTS

| | | | | |
|---|---|---|---|---|
| 6,799,210 | B1* | 9/2004 | Gentry et al. | 709/223 |
| 2001/0005372 | A1* | 6/2001 | Cave et al. | 370/401 |
| 2001/0053154 | A1* | 12/2001 | Christie et al. | 370/466 |
| 2003/0031173 | A1* | 2/2003 | Park et al. | 370/389 |
| 2004/0228328 | A1* | 11/2004 | Potter et al. | 370/352 |
| 2005/0008008 | A1* | 1/2005 | Ohura | 370/352 |
| 2005/0174990 | A1* | 8/2005 | Riemann et al. | 370/352 |

OTHER PUBLICATIONS

Korpi M et al "Supplementary services in the H., 323 IP telephony network" IEEE Communications magazine, US, IEE Service Center. Piscataway, N.J, vol. 37, No. 7, Jul. 1999, pp. 118-125, p. 118, column 2, line38-line 48 Figure 1.

(Continued)

*Primary Examiner*—Ricky Q. Ngo
*Assistant Examiner*—Gary Mui
(74) *Attorney, Agent, or Firm*—McCracken & Frank LLP

(57) ABSTRACT

A call server, a media gateway and terminals are connected to a packet switching network. Other terminals are connected to the gateway interfaces. The method for setting up communication includes generating a call processing task for the calling terminal in the call server, transmitting by the task a connection set-up message including at least an identifier of the called terminal and a first network address enabling to reach the calling terminal, generating a call processing task for the called terminal, and sending, based on the task to a second network address enabling to reach the called terminal, signaling data indicating in particular the first network address. When the first and second network addresses are identical and correspond to a gateway address, the latter sets up between the two terminals a communication path which does not pass through the network.

5 Claims, 4 Drawing Sheets

OTHER PUBLICATIONS

Thom G A: "H. 323: The Multimedia communications standard for local area networks" IEEE Communications magazine, US, IEEE Service Center. Piscataway, N.J, vol. 34, No. 12, Dec. 1, 1996, pp. 52-56, p. 53, column 2, line 29—p. 54, column 2, line 5 figure 3.

Anquetil L—P et al: "Media gateway control protocol and voice over ip gateways. MGCP and VOIP Gateways will offer seamless Interworking of new Voip Network with today's telephone networks" electrical communication, Alcatel. Brussels, BE, Apr. 1, 1999, pp. 151-157, p. 153 column 3, line 8-line 18.

Salman M A et al: "The Future of Ip-PSTN Interworking" Utrecht, NL, Aug. 24-28, 1999, London: IBTE, GB, Aug. 24, 1999, pp. 163-167, the whole document.

Huitema C et al: "An Architecture for residential internet telephony service" IEEE Network, IEEE INC. New York, US, vol. 13, No. 3, May 1999, pp. 50-56, the whole document.

"Internet Protocol", Request for Comments (RFC) 760, Internet Engineering Task Force (IETF), janvier 1980.

"SIP : Session Initiation Protocol", RFC 2543, IETF, mars 1999.

"Megaco Protocol", Internet Draft, IETF, 21 Février 2000.

"User Datagram Protocol", RFC 768, IETF, août 1980.

"Transmission Control Protocol", RFC 793, IETF, Sep. 1981.

"International Search Report, PCT/FR01/02161 dated Oct. 24, 2001."

\* cited by examiner

METHOD OF SETTING UP COMMUNICATIONS IN A PACKET SWITCHING SYSTEM

The present invention relates to a method of setting up communications between terminals in a communication system, in particular in a multimedia system.

The invention applies in particular to a communication system operating on a network for transmitting packets according to the IP protocol ("Internet Protocol", Request for Comments (RFC) 760, Internet Engineering Task Force (IETF), January 1980) to which one or more call servers providing telephony services to a collection of subscribers are connected.

The success of networks operating according to the IP protocol has led to the development of real-time protocols RTP ("Real Time Protocol"), and RTCP ("Real Time Control Protocol") capable of supporting traffic of telephony type. Telephony terminals which link up to such networks, hereinbelow called "IP terminals", are now available. These IP terminals can in particular take the form of conventional telephones, designed to operate on circuit switching networks, associated with appropriate adapters, of telephone terminals which can be linked directly to the IP network (for example ETHERSET terminals marketed by the company Nortel Networks), or of microcomputers equipped with telephony software (for example NETMEETING telephone software marketed by the company Microsoft).

The success of IP networks suggests moreover that they be used to support telephony traffic or more generally multimedia traffic not only between two users of IP terminals, but also between users of traditional terminals. One of the objectives of the TIPHON project ("Telecommunications and Internet Protocol Harmonization Over Networks") conducted by ETSI ("European Telecommunications Standards Institute") is to solve the problems of interworking between voice over IP transport applications and circuit switching networks.

This project borrows the functional model defined in the H.323 standard of the International Telecommunications Union (ITU-T), which defines three entities, the gatekeeper, the gateway, and the terminal. The functions of the H.323 gateway have been distributed by TIPHON over three modules: the signaling gateway (SG), the media gateway (MGW), and the media gateway controller (MGC).

The media gateway converts streams originating from a first type of network to a format corresponding to a second type of network. When it is used for example between a conventional circuit switching network and a packet switching network operating according to the IP protocol, it typically provides a point of access for various types of "conventional" terminals (analog terminals, ISDN stations, wireless telephone relays, etc.), and it moreover comprises a point of access connected to the IP network.

In this architecture, the signal processing relating to the setting up of a communication (or any other provision of service) through the media gateway is performed by the gateway controller (MGC). This processing comprises on the one hand the tasks of supervising the MGW so as to identify the voice signaling (line seizure, release, dialing, occupancy, charging, etc.) and to translate it into high-level signaling and so as to address various commands to the MGW (ringing, tones, display, etc.), and on the other hand call management tasks for processing requests relating to the MGW.

The call management tasks customarily use messages according to standardized formats and protocols, such as for example H.323 or SIP ("SIP: Session Initiation Protocol", RFC 2543, IETF, March 1999), while the MGW control tasks carry out the necessary translations for taking account of the specific individualities of the various types of terminals or of networks capable of being linked to the driven MGW. For this purpose, the MGC has the capability to download to the MGW scripts describing profiles of terminals using protocols such as MGCP, H.248, or Megaco.

These protocols describe the messages exchanged by physically distinct MGW and MGC entities (see for example, "Megaco Protocol", Internet Draft, IETF, Feb. 21, 2000). They allow several MGWs to be driven by a single MGC. Each MGW is driven entirely by an MGC, so that it comprises no software intelligence. This functional distinction, based essentially on the boundary between software and hardware, compels the MGC to have the capacity to drive all the signalings of the connection lines of the various items of equipment which may be connected to each driven MGW. This considerably increases the complexity of the messages exchanged over the interface between the two types of equipment.

A further drawback is revealed by analyzing the signal processing performed when setting up a voice path between two terminals connected to one and the same MGW. Currently, the MGWs incorporate a switching matrix which makes it possible to effect connections between the various conventional telephony interfaces so as to ensure the routing of the signals in circuit mode. On receipt of a call setup message originating from a call server and destined for a conventional terminal linked to a point of access of an MGW driven by an MGC, the MGC sends the MGW a request for connection within the MGW between the IP access point, an input of the switching matrix, and the point of access of the requested terminal, including in the case where the call originates from a conventional terminal linked to the same MGW as the called terminal. Only the MGC can in fact control the internal connections effected within an MGW so as to connect two points of access, just as the connections between the IP access point of the MGW.

Thus, as soon as a communication involving two terminals connected to the same media gateway is to be set up, the setup phase requires the reserving of resources of the IP access point at the level of the home MGW hosting the terminals with a view to the setting up of the required connections.

An aim of the present invention is to optimize, in a communication system of this type, the use of the resources mobilized within the entities forming the gateways.

According to the invention, there is proposed a method of setting up communications in a system comprising a packet switching network, at least one call server connected to the network, at least one media gateway connected to the network at a gateway address, a first collection of terminals connected to the network at respective terminal addresses, and a second collection of terminals connected to interfaces of the media gateway. Each terminal is associated with a call server in respect of signaling processing. The method according to the invention comprises the following steps for setting up a communication between calling and called terminals:

creation of a first call processing task in the call server associated with the calling terminal;

transmission, by the first call processing task, of a setup message including at least one identifier of the called terminal and a first network address making it possible to reach the calling terminal;

in response to the receipt of said setup message, creation of a second call processing task in the call server associated with the called terminal;

sending, from the second call processing task to a second network address making it possible to reach the called terminal, of signaling information indicating at least said first network address;

when the first and second network address are identical and correspond to a gateway address, setup within the gateway having said address of a communication path between the calling and called terminals, not passing through the packet switching network.

The method optimizes the use of the packet switching network serving as support a communication system (this network will generally be of IP type). Passage through the IP network and use of the corresponding addressing resources are avoided when the gateway determines that it can route the communication locally without passing through the network interface.

Another aspect of the present invention concerns a media gateway, comprising an interface for linking to a packet switching network, interfaces for linking a collection of terminals, a switching matrix connected to said interfaces, and means of control of the interfaces and of the switching matrix so as to set up communication paths, at least one call server being connected to the network so as to perform signaling processing for at least the terminals of said collection, in which the control means are arranged so as to set up a communication path in response to instructions emanating from the call server in a signaling exchange performed over the packet switching network, in the course of which exchange the control means obtain respective network addresses for calling and called terminals, at least one of which belongs to said collection, the path set up passing through interfaces for linking of the calling and called terminals and through the switching matrix, without passing through the interface for linking to the network, when said network addresses are identical and correspond to a network address of the gateway, the path set up passing through an interface for linking of one of the calling and called terminals, through the interface for linking to the network and through the switching matrix when one of said network addresses differs from the network address of the gateway.

Other features and advantages of the invention will become apparent in the description hereinbelow of non-limiting exemplary embodiments, with reference to the appended drawings, in which:

FIG. 1 shows, by way of illustration, an exemplary communication system constructed on the basis of an IP network consisting of two local area networks (LAN) 54, 55 connected together by way of a wide-area network (WAN) 56. The WAN plays the role of interconnection between the subnetworks 54, 55 formed by the LANS.

Figure 1:
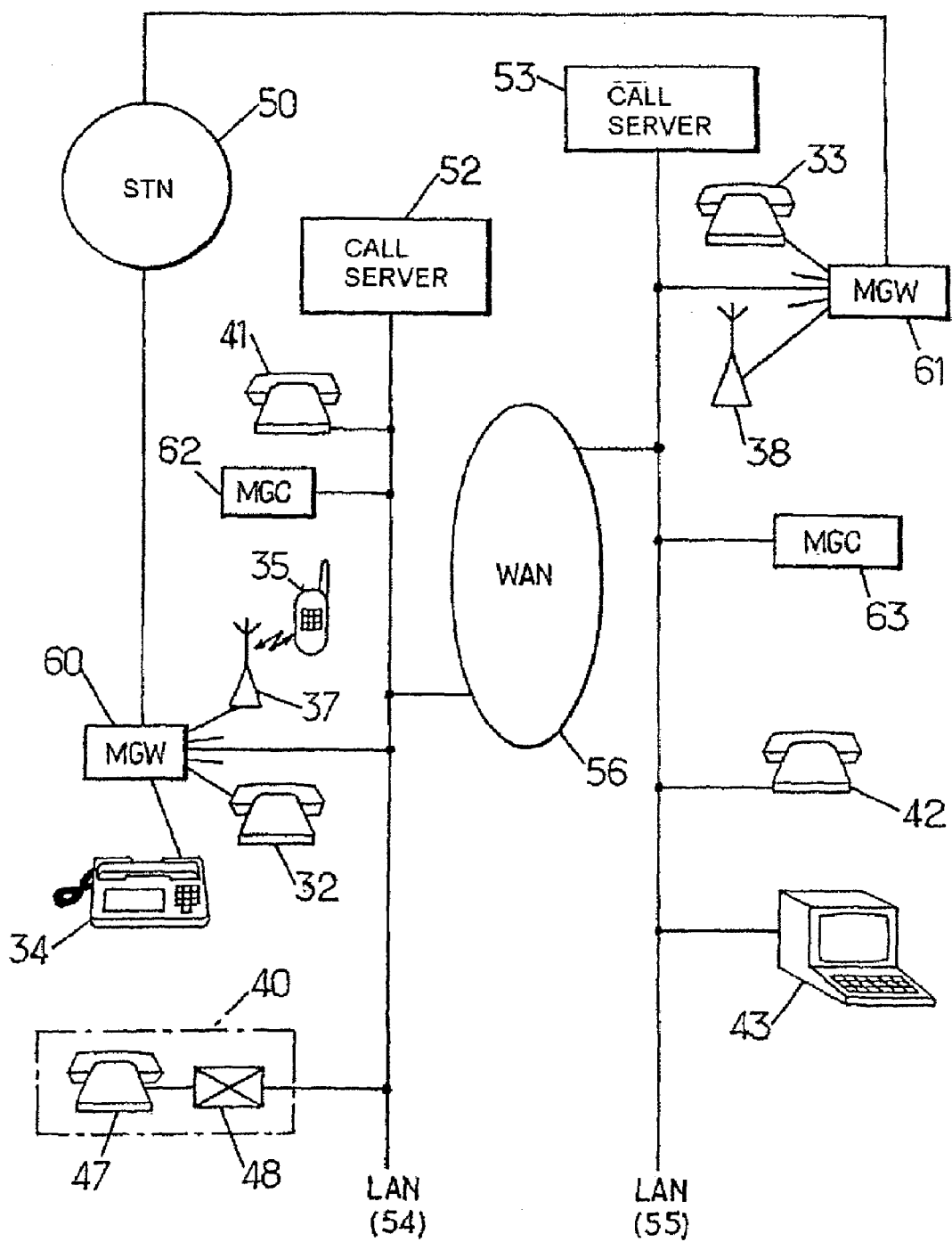
FIG. 1 is a diagram of a communication system implementing the invention.

Various IP terminals 40-43 are connected directly to the LANs 54, 55, and are managed by two call servers 52, 53 which are connected to the subnetworks 54, 55 respectively. There could also be a single call server for the whole network. Such a terminal 40 may be a conventional telephone 47 associated with an adapter 48 for linking to the IP network, a telephone terminal 41, 42 incorporating an IP interface or else a microcomputer 43 executing a telephony over IP network application.

The invention is described hereinbelow in the particular case where the network uses the H.323 standard of the ITU-T for call signaling. Each call server 52, 53 then has a gatekeeper function.

For the transmission of coded speech over the IP network 54-56, use is made, as is normal, of the UDP transport protocol ("User Datagram Protocol", RFC 768, IETF, August 1980) and the RTP and RTCP real-time protocols. Various modes of speech coding/decoding can be used by the IP terminals 40-43. In the case of H.323, the audio coding can comply with one of the recommendations G.711, G.722, G.723.1, G.728 and G.729 of the ITU-T.

In the example represented, each subnetwork comprises a media gateway (MGW) 60, 61 connected to the LAN 54, 55. Each MGW has a determined address in the IP network. Conventional terminals (that is to say non-IP) 32-35 can be connected to one of the MGWs 60, 61. These terminals are for example of S.63 type (32, 33) or ISDN type (34) or else wireless terminals 35 which connect up by way of radio installations 37, 38 (for example DECT) connected to the MGWs.

One or more MGWs may moreover comprise interfaces for linking to external networks such as a switched telephone network (STN) 50.

In the example represented, each MGW is driven respectively by a media gateway controller (MGC) 62, 63. The MGC/MGW assembly ensures the interface between the IP network equipped with its call servers 52, 53 and various types of lines, depending on the desired compatibilities of the system.

The signaling between the call server 52, 53 and the MGC 62, 63 is for example transported according to the protocols of the H.323 standard (H.225 for high-level signaling and H.245 for voice signaling), while the Megaco protocol can structure the exchanges between the MGC 62, 63 and the MGW 60, 61.

Each telephone terminal 32-35, 40-43 capable of communicating by way of the network 54-56 has a host call server which, in the case of a wire terminal, is typically that linked to the same subnetwork as the terminal. This host call server ensures in particular the signaling processing relating to the terminals.

In the example considered, the signaling is transmitted over the IP network in accordance with the H.323 standard in sessions of the TCP transport protocol ("Transmission Control Protocol", RFC 793, IETF, September 1981) set up between two call servers or between an IP terminal and its call server. In the case of a terminal connected by way of a gateway 60, 61, its call server 52, 53 talks to the MGC 62, 63 according to the H.323 standard in a TCP session, the MGC 62, 63 talks to the MGW 60, 61 according to the Megaco protocol in another TCP session, and the MGW talks to the terminal according to the signaling format specific to the type of terminal.

Figure 2:
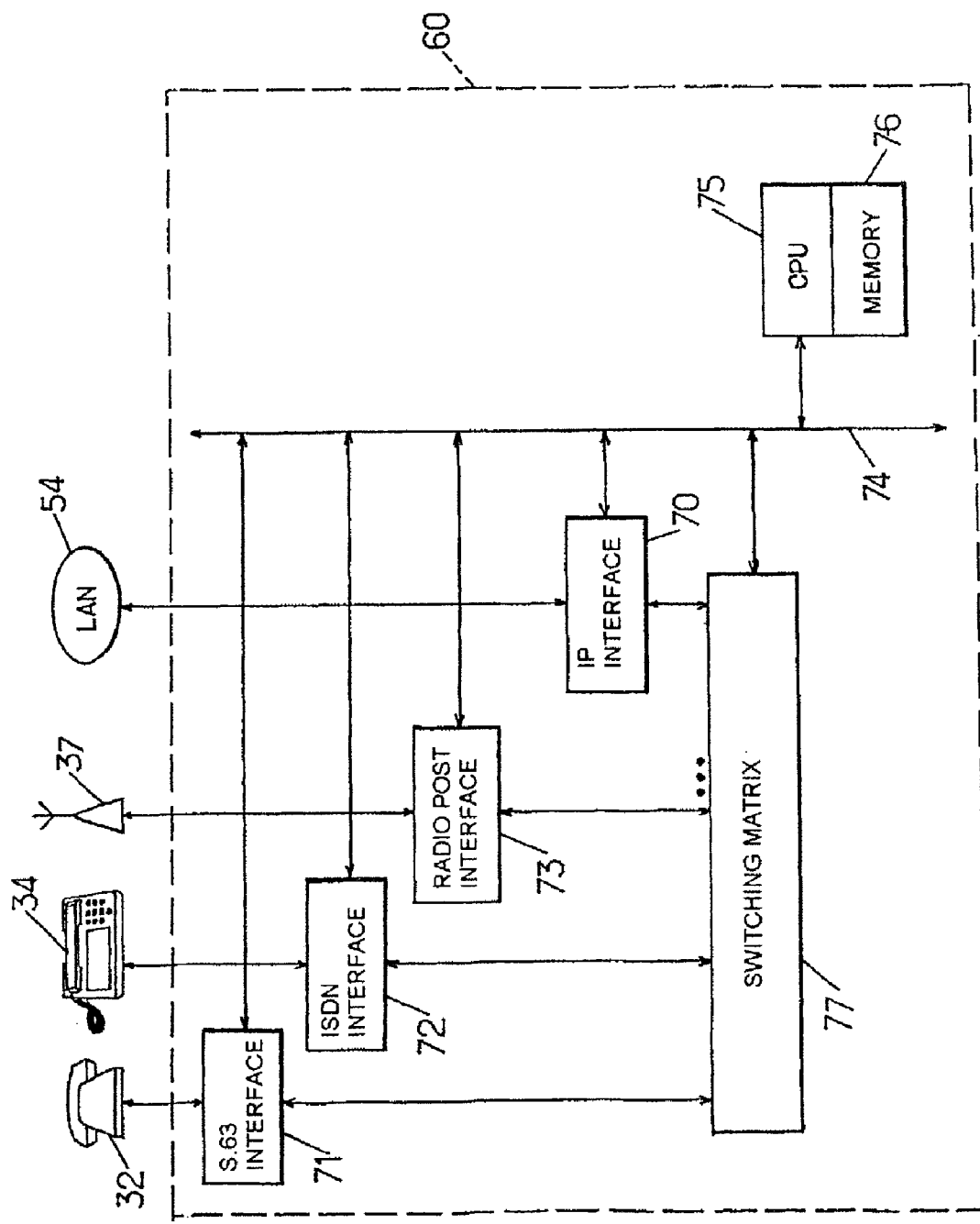
FIG. 2 is a schematic diagram of a gateway according to the invention.

FIG. 2 shows the structure of an MGW 60 which incorporates points of access for analog terminals 32, ISDN terminals 34 and for the linking of radio installations 37, as well as a point of access for linking to the LAN 54.

Each point of access of the MGW 60 comprises a physical interface 70-73, which ensures the physical signaling functions (detection of events, commands, etc.). Each of these interfaces 70-73 is connected to the bus 74 of a processor 75 associated with a memory 76. They are moreover connected to a switching matrix 77, which operates a physical switching, under the control of the processor 75, between time-multiplexed channels in accordance with a multiplexing scheme specific to the MGW.

The IP interface 70 is connected to the LAN 54, at the IP address of the gateway. Under this address, it uses one or more TCP logic ports for the exchanges of signaling with the associated MGC, and UDP logic ports for the various open RTP-RTCP sessions for transporting coded speech. The TCP signaling port makes the signaling programs of the processor 75 talk to the MGC. The RTP/UDP ports are associated with translation modules connected to the switching matrix 77.

In the example represented, the MGW has one or more interfaces 71 for analog terminals 32, one or more interfaces 72 for ISDN terminals 34 and one or more interfaces 73 for radio installations 37. Each of these interfaces 71-73 caters for the translations and shapings required for the compatibility of the facilities linked to the points of access with the format used by the switching matrix. It extracts the signaling received on the line connected to the point of access and advises the processor 75 thereof, so that the latter forwards the signaling information to the MGCG and it inserts signaling onto the line under the control of the processor 75.

A half-call relating to a terminal comprises the creation of a Single Call Monitor (SCM) task in the terminal's host call server, which carries out all the analysis and decision functions (call routing, request for capability, etc.) involved in call management. For these functions, the SCM consults tables stored in the call server, containing the association between the terminal's directory number and a corresponding IP address, at which this terminal can be reached (the terminal's own IP address if it is of IP type, and the IP address of an MGC and/or MGW gateway otherwise). These tables furthermore define the user's rights.

Various types of software modules are used by the processors of the MGC and of the MGW to perform the signaling processing. A half-call relating to a non-IP terminal thus comprises the creation of a task T_MGC within the MGC 62, 63 which carries out the functions of interfacing with the SCM of the call server, while a task T_MGW within the MGW 60, 61 manages the details specific to each type of terminal. For these functions, the T_MGW consults tables stored in the memory 66, which contain in particular information relating to the type and to the identification of the interface 71-73 to which the terminal equipment is connected as well as to the identification of the associated user (directory number). The T_MGC consults tables stored in the MGC 62, 63, which contain in particular information making it possible to associate users' identification information, namely their directory numbers, and the IP addresses of the MGWs 60, 61 to which they are linked. During initializing of the MGW 60, 61, the task T_MGW constructs its tables and declares itself to the MGC 62, 63. Allowance for the mobility of the wireless terminals 35 may lead to updatings of these tables in the MGWs and the MGCs.

Thus, the SCM task executed in the call server manipulates only terminal equipment identified by IP addresses and directory numbers.

As a variant, it is possible to dispense with the MGCs 62, 63 and to make the call servers 52, 53 talk directly to the MGWs 60, 61 without using the Megaco protocol. It suffices to furnish the MGW with the capacity to process the H.323 signaling.

This variant will be considered in the call scenarios described hereinbelow, so as to streamline the description thereof. This may readily be carried over to the case where the network is equipped with MGCs using an intermediate protocol such as Megaco or MGCP.

Figure 3:
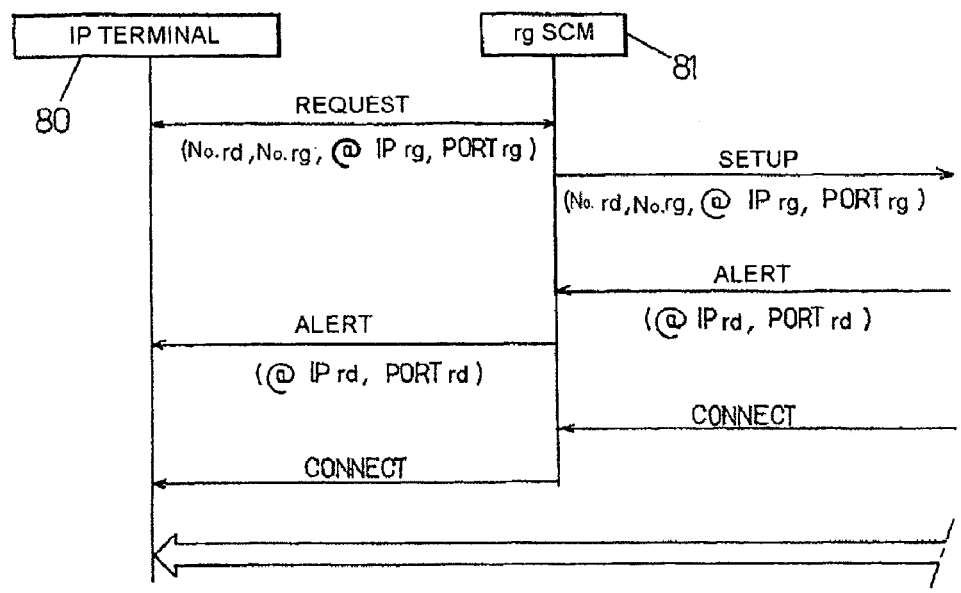
FIGS. 3 to 6 are charts illustrating half-call procedures respectively in the case of a calling terminal of IP type, in the case of a called terminal of IP type, in the case of a calling terminal of non-IP type and in the case of a called terminal of non-IP type.
Figure 4:
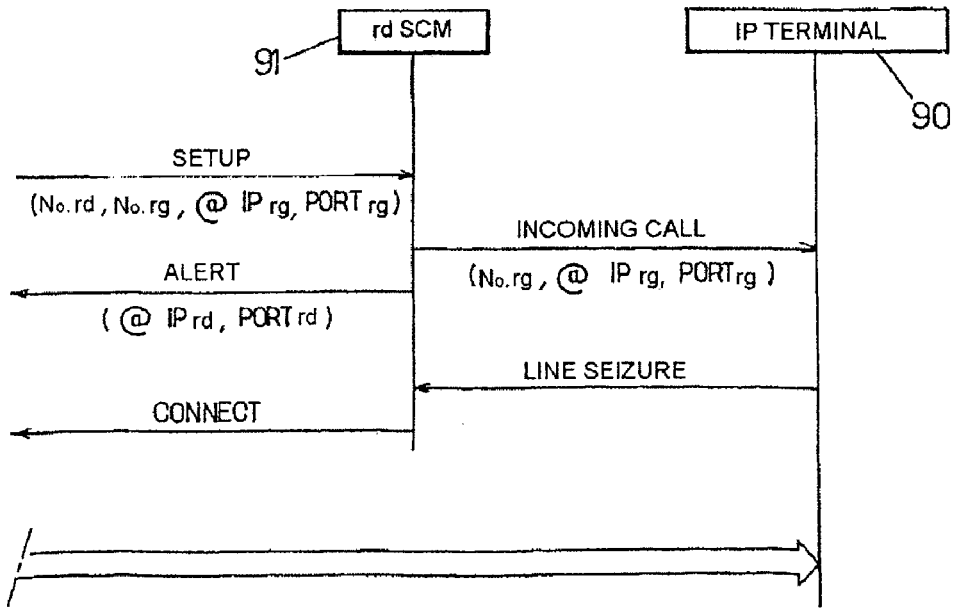
Figure 5:
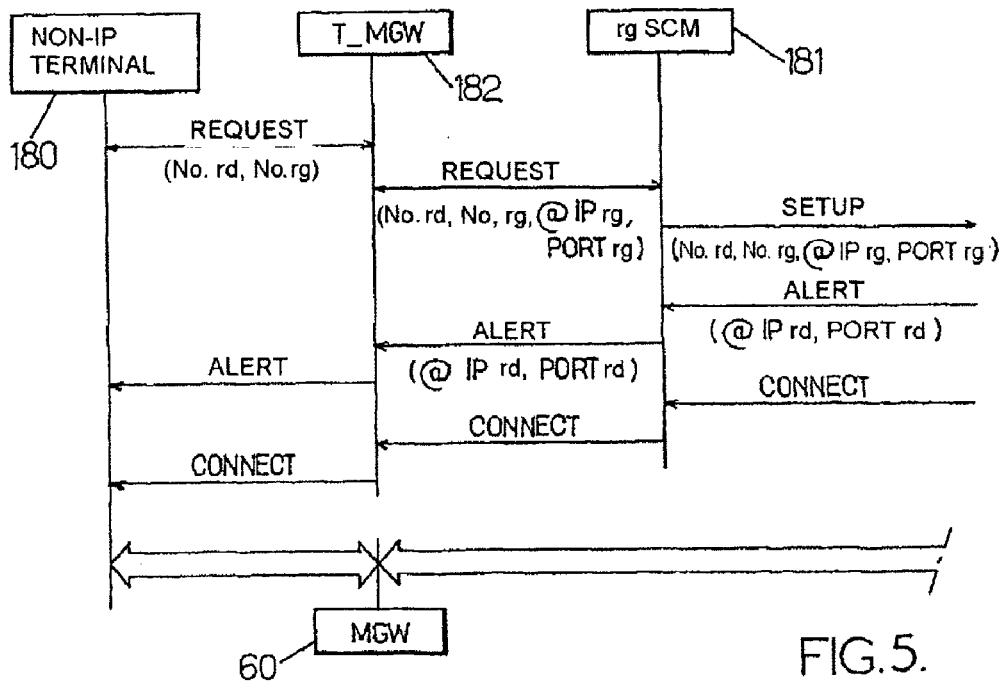
Figure 6:
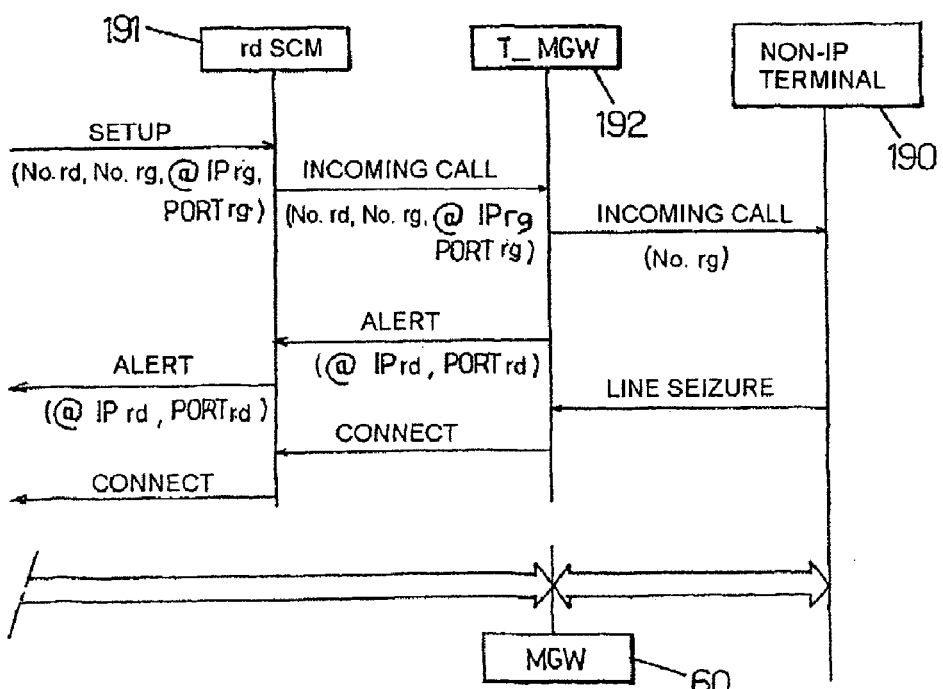

In the charts of FIGS. 3 to 6, each half-call relating to a terminal entails a call processing which is executed completely in the call server 52, 53 in the case of an IP terminal 40-43 (SCM task, FIGS. 3 and 4), and which is divided into SCM tasks, as appropriate T_MGC, and T_MGW in the case of a non-IP terminal (FIGS. 5 and 6). In each chart, the notation "rg" refers to the requesting terminal, and the notation "rd" refers to the requested terminal.

A call begins with an exchange of information between the calling terminal 80, 180 and the SCM task 81, 181 corresponding thereto (FIGS. 3 and 5). This SCM task has for example been created by the call server of the calling terminal 80, 180 on receipt of a message signaling line seizure by this terminal. It addresses to the terminal the messages coding the information to be presented to the user (displays, tones, etc.), and recovers the data supplied by the user to define his request (choice of functions, dialing, etc.).

When the exchange with the calling terminal 80, 180 affords it sufficient information, the SCM task 81, 181 produces a setup message comprising in particular the following elements:

the directory number of the called terminal 90, 190, defined directly or indirectly by the user of the calling terminal 80, 180;

an IP address making it possible to reach the calling terminal 80, 180 in the network 54-56, a corresponding UDP port number for the transmission of voice according to the RTP protocol and another UDP port number for the transmission of control information according to the RTCP protocol;

possibly the directory number of the calling terminal 80, 180.

The setup message is sent to the IP address of the call server which will create the SCM task 91, 191 for the half-call on the requested side. This IP address is deduced from the directory number of the called terminal. This deduction may be implicit in the organization of the directory numbers, or may result from the consultation of a table available to the call servers. If the same call server is required to process the half-call on the requested side (this always occurring in the particular case where there is just one call server), the setup message needs not travel over the IP network.

In the case of a calling terminal 80 of IP type, the dialogue with the call server takes place directly in a TCP connection between the terminal and the SCM task 81 (FIG. 3).

In the case of a non-IP terminal 180, it takes place by way of the task T_MGW 182 (and T_MGC as appropriate) which effects the software interface with the H.323 and/or Megaco protocol (FIG. 5). The task T_MGW 182 is created in the gateway 60 on receipt of the signaling of line seizure by the relevant physical interface 71-73. It is this task T_MGW which supplies the IP address (namely that of the MGW) and the UDP port numbers assigned to the terminal, and it transmits a session opening message to the IP address of the corresponding call server 52.

If it accepts the call, the SCM task 91, 191 for the half-call on the requested side transmits an incoming call signaling to the requested terminal 90, 190 (FIGS. 4 and 6), by supplying at least the IP address and the UDP port numbers defined for the calling terminal in the setup message, and possibly its directory number.

In the case of a called terminal 90 of IP type, the call server transmits this signaling directly in a TCP connection between the terminal and the SCM task 91 (FIG. 4).

In the case of a non-IP terminal 190, the call server transmits this signaling to the MGW 60, while appending the directory number of the requested terminal. On receipt of this information, the MGW creates a task T_MGW, which communicates the incoming call to the requested terminal 190 and assigns available UDP ports of the interface 70 thereto.

The (IP address, UDP port) pair which is valid for the requested terminal 90, 190 is returned to the SCM 81, 181 on the requesting side (ALERT message of FIGS. 4 and 6), which transmits it to the IP address assigned to the calling terminal, that is to say to the IP address of the terminal in the case of FIG. 3, and to that of its MGW in the case of FIG. 5.

This makes it possible to define a path which can be used for communication inside the IP network, since the IP terminals and the MGWs know the (IP address, UDP port) pairs of their counterpart.

When the called terminal 90, 190 seizes the line, the communication can commence (CONNECT signaling message in FIGS. 3 to 6).

If one of the terminals is not of IP type, the processor 75 of its MGW completes the communication path by instructing the IP interface 70, the switching matrix 77 and the interface 71-73 to which the terminal is linked so that the interfaces carry out the required translations and that the matrix 77 makes them communicate with one another.

Sometimes, the two communicating terminals are linked to the same MGW. This is immediately detectable by the T_MGW tasks since the IP addresses assigned to the two terminals are identical and correspond to that of the MGW.

In this case, the T_MGW task does not reserve any UDP ports of the IP interface 70 for the communication. Coded speech will not pass through the IP interface 70, but through the interfaces 71-73 to which the two terminals are respectively linked and through the switching matrix 77. The processor 75 instructs these two interfaces and the matrix 77 accordingly.

This process optimizes the use of the resources of the IP network as well as of its interfaces in the gateways.

The invention claimed is:

1. A method of setting up communications in a system comprising a packet switching network, between at least one call server connected to the network, at least one media gateway connected to the network at a gateway address, a first collection of terminals connected to the network at respective terminal addresses, and a second collection of terminals connected to interfaces of the media gateway, wherein each terminal is associated with the call server in respect of signaling processing, the method comprising the following steps for setting up a communication between calling and called terminals:

creating a first call processing task in the call server associated with the calling terminal;

transmitting, by the first call processing task, a setup message including at least one identifier of the called terminal and a first network address making it possible to reach the calling terminal;

in response to the receipt of said setup message, creating a second call processing task in the call server associated with the called terminal;

sending, from the second call processing task to a second network address making it possible to reach the called terminal, of signaling information indicating at least said first network address;

when the first and second network address are identical and correspond to the gateway address, setting up within the gateway having said gateway address communication path between the calling and called terminals, not passing through the packet switching network.

2. The method as claimed in claim 1, wherein the system furthermore comprises at least one media gateway controller having an address in the packet switching network, and wherein, when said second address corresponds to the gateway address, said signaling information is transmitted from the second call processing task to the media gateway controller and relayed to the second network address by the media gateway controller.

3. The method as claimed in claim 2, wherein the packet switching network operates according to IP protocol.

4. The method as claimed in claim 1, wherein the packet switching network operates according to an IP protocol.

5. A media gateway, comprising:

an interface for linking to a packet switching network;

interfaces for linking a collection of terminals;

a switching matrix connected to said interfaces;

at least one call server being connected to the network so as to perform signaling processing for at least the terminals of said collection, and means for controlling the interfaces and the switching matrix adapted to set up a communication path in response to instructions emanating from the call server in a signaling exchange performed over the packet switching network, in the course of which exchange, respective network addresses for calling and called terminals, one at least of which belongs to said collection, are obtained by the control mean, the communication path passing through interfaces for linking of the calling and the called terminals and through the switching matrix, without passing through the interface for linking to the network, when said network addresses are identical and correspond to a network address of the gateway, and the communication path passing through an interface for linking of the calling and the called terminals, through the interface for linking to the network and through the switching matrix, when one of said network addresses differs from the network address of the gateway.

* * * * *